US012625597B2

(12) United States Patent　(10) Patent No.: US 12,625,597 B2
Lee et al.　(45) Date of Patent: May 12, 2026

(54) METHOD FOR DISPLAYING SUGGESTED ITEMS ASSOCIATED WITH MESSAGES, AND APPARATUS FOR IMPLEMENTING THE SAME

(71) Applicant: SAMSUNG SDS CO., LTD., Seoul (KR)

(72) Inventors: Sun Hyo Lee, Seoul (KR); Ji Eun Yoon, Seoul (KR); Moon Young Kwon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 160 days.

(21) Appl. No.: 18/383,695

(22) Filed: Oct. 25, 2023

(65) Prior Publication Data

US 2024/0143133 A1　May 2, 2024

(30) Foreign Application Priority Data

Oct. 28, 2022　(KR) ........................ 10-2022-0141589

(51) Int. Cl.
*G06F 3/0482* (2013.01)
*G06F 40/279* (2020.01)
*H04L 51/04* (2022.01)

(52) U.S. Cl.
CPC .......... *G06F 3/0482* (2013.01); *G06F 40/279* (2020.01); *H04L 51/04* (2013.01)

(58) Field of Classification Search
CPC ....... G06F 3/0482; G06F 40/279; H04L 51/04
See application file for complete search history.

(56) References Cited

U.S. PATENT DOCUMENTS

| | | | |
|---|---|---|---|
| 10,171,552 B2 | 1/2019 | Häusler et al. | |
| 10,503,831 B2 | 12/2019 | Henderson et al. | |
| 10,701,014 B2 | 6/2020 | Perazzo et al. | |
| 10,984,382 B2 | 4/2021 | Scott | |
| 2008/0300944 A1* | 12/2008 | Surazski | .............. G06Q 10/109 |
| | | | 707/999.107 |
| 2019/0050393 A1* | 2/2019 | Henderson | ............ H04L 12/185 |
| 2021/0149548 A1* | 5/2021 | Baunach | .............. G06F 16/953 |
| 2021/0258272 A1 | 8/2021 | Wu | |
| 2023/0412554 A1* | 12/2023 | Hassan | .............. G06F 3/04842 |

OTHER PUBLICATIONS

Mohamed Fazil et al., A Technique for Extracting the Intention of Messengers in Social Media, Dec. 7, 2020, ITU Kaleidoscope: Industry-Driven Digital Transformation, pp. 1-8 (Year: 2020).*
Abhijit R. Joshi et al., Analysis and Detection of Eventful Messages in Instant Messengers, Mar. 1, 2016, International Conference on Computing for Sustainable Global Development, pp. 2503-2507 (Year: 2016).*

* cited by examiner

*Primary Examiner* — Tam T Tran
(74) *Attorney, Agent, or Firm* — Sughrue Mion, PLLC

(57) ABSTRACT

A method for displaying suggested items associated with a message, the method, which performed by at least one processor, includes: based on a preset first keyword that is detected in a message that is input to an input window of a chat room, displaying suggested items comprising a conversation group or a content associated with the preset first keyword, wherein the conversation group corresponds to a reception target of the message; and based on an item selected from the suggested items, displaying the message comprising information on the conversation group or the content corresponding to the selected item.

17 Claims, 13 Drawing Sheets

<Sending screen>

<Reception screen>

1

METHOD FOR DISPLAYING SUGGESTED ITEMS ASSOCIATED WITH MESSAGES, AND APPARATUS FOR IMPLEMENTING THE SAME

CROSS-REFERENCE TO RELATED APPLICATION(S)

This application is based on and claims priority under 35 U.S.C. § 119 to Korean Patent Application No. 10-2022-0141589 filed on Oct. 28, 2022 in the Korean Intellectual Property Office, the disclosure of which is incorporated by reference herein in its entirety.

BACKGROUND

1. Field

The disclosure relates to a method for displaying suggested items associated with messages, and an apparatus for implementing the same. More particularly, the disclosure relates to a method for displaying suggested items associated with messages in order to provide information on the suggested items associated with the messages input in a chat room, and an apparatus for implementing the same.

2. Description of the Related Art

Conventionally, in multi-party communication using a messenger, a user may select a conversation partner by a manner of targeting all members participating in a conversation or manually mentioning (e.g., @mention) a specific member when selecting the conversation partner and send a message to the selected conversation partner.

However, when the user manually mentions a specific member in a group chat room including several members and sends the message to the specific member, there is a problem that the message is unnecessarily exposed to other members. That is, it may be impossible to send the message that is exposed only to the specific member in the group chat room.

In addition, in a case of a messenger that does not have a function of selecting a specific member, such as @mention, in the group chat room, there is a limitation that the user should exit the group chat room and search a one-on-one chat room with the specific member or create a new one-to-one chat room with the specific member in order to send a message to the specific member.

Meanwhile, conventionally, when it is necessary to share a specific content during a conversation in the group chat room, the movement of a screen such as exiting the group chat room and accessing a service related to the specific content occurs in order to obtain information on the specific content. In this case, a flow of conversation is interrupted, which is inconvenient.

Accordingly, there is a need for a technology capable of exposing a message only to a specific member, if necessary, during a conversation with multiple members in a group chat room. In addition, there is a need for a technology capable of quickly sharing information on a specific content in a group chat room without moving to another service screen.

SUMMARY

Provided are a method for displaying suggested items associated with messages capable of suggesting a sending group or an associated content of a message by analyzing a keyword input while writing the message in a chat room of a messenger, and an apparatus for implementing the same.

Provided are a method for displaying suggested items associated with messages capable of sending a message so that the message is exposed only to a specific member during a conversation in a group chat room of a messenger, and an apparatus for implementing the same.

Provided are a method for displaying suggested items associated with messages capable of confirming a content related to a message input to a chat room of a messenger within the chat room without moving a screen and then sending the content along with the message, and an apparatus for implementing the same.

According to an aspect of the disclosure, a method for displaying suggested items associated with a message, the method, which performed by at least one processor, includes: based on a preset first keyword that is detected in a message that is input to an input window of a chat room, displaying suggested items comprising a conversation group or a content associated with the preset first keyword, wherein the conversation group corresponds to a reception target of the message; and based on an item selected from the suggested items, displaying the message comprising information on the conversation group or the content corresponding to the selected item.

In some embodiments, the displaying of the suggested items includes, based on the preset first keyword being a keyword regarding user information, displaying the suggested items comprising a plurality of conversation groups associated with the user information corresponding to the preset first keyword.

In some embodiments, the displaying of the suggested items includes, based on the preset first keyword being a keyword regarding content information, displaying the suggested items comprising a plurality of contents associated with the content information corresponding to the preset first keyword.

In some embodiments, the user information includes a user state and a user profile, and wherein the content information includes at least one of e-mail, schedule, contact, or file information.

In some embodiments, the displaying of the suggested items includes: based on a determination that both the conversation group associated with the preset first keyword and the content associated with the preset first keyword exist, assigning priorities to the conversation group and the content based on contents of the message; and displaying, as a suggested item, an item having a higher priority, of the conversation group and the content associated with the preset first keyword.

In some embodiments, the displaying of the suggested items includes: based on a determination that both the conversation group associated with the preset first keyword and the content associated with the preset first keyword exist, displaying a first suggested item comprising the conversation group and a second suggested item comprising the content; and displaying, as a suggested item, any one of the first suggested item and the second suggested item selected by a user input.

In some embodiments, the displaying of the suggested items includes displaying the suggested items in an area adjacent to the input window.

In some embodiments, the displaying of the message including the information on the conversation group or the content includes: based on the item selected from the suggested items, displaying the selected item in an activated state; and based on a completion of sending of the message, displaying a link item capable of confirming contents of the selected item of the suggested items along with the message of which the sending has been completed.

In some embodiments, the displaying of the link item includes, based on the selected item of the suggested items, the selected item being a first conversation group, displaying users belonging to the first conversation group and confirmation states of the message by the users based on the link item being selected, and wherein the message is displayed only on terminals of the users belonging to the first conversation group.

In some embodiments, the displaying of the link item includes: based on the selected item of the suggested items being a content, and the link item being selected, displaying the content of the selected item.

In some embodiments, the method further includes: both the preset first keyword and a preset second keyword that are detected in the message that is input to the input window of the chat room, simultaneously providing a first suggested item associated with the preset first keyword and a second suggested item associated with the preset second keyword.

In some embodiments, the simultaneous providing of the first suggested item and the second suggested item includes: displaying the first suggested item and a search indicator; and based on a user input for the search indicator being received, displaying the second suggested item.

In some embodiments, the displaying of the suggested items includes: transmitting a request for information on the conversation group or the content associated with the preset first keyword to a server; receiving, from the server, the information on the conversation group or the content associated with the preset first keyword extracted based on user information and plural types of content information stored in the server; and displaying the suggested items based on the information received from the server.

According to an aspect of the disclosure, a non-transitory computer-readable recording medium storing computer program, which, when executed by at least one processor, causes the at least one processor to execute: based on a preset first keyword that is detected in a message that is input to an input window of a chat room, display suggested items comprising a conversation group or a content associated with the preset first keyword, wherein the conversation group corresponds to a reception target of the message; and an item selected from the suggested items, display the message comprising information on the conversation group or the content corresponding to the selected item.

According to an aspect of the disclosure, a messenger client terminal includes: one or more processors; a memory configured to load a computer program executable by the one or more processors; and wherein the computer program includes instructions, which, when executed by the one or more processors, cause the one or more processors to execute: based on a preset first keyword being detected in a message that is input to an input window of a chat room, displaying suggested items comprising a conversation group or a content associated with the preset first keyword, the conversation group being a reception target of the message; and based on the item selected from the suggested items, displaying the message comprising information on the conversation group or the content corresponding to the selected item.

In some embodiments, the preset first keyword includes at least one of a tense, a department, a rank, a business, an employment state, a user profile, an e-mail title, a file name, a meeting title, meeting room information, or contact information.

In some embodiments, the displaying of the suggested items includes: an operation of sorting and displaying the suggested items comprising the conversation group or the content associated with the preset first keyword based on a similarity to the message.

BRIEF DESCRIPTION OF THE DRAWINGS

The above and other aspects and features of the disclosure will become more apparent by describing in detail example embodiments thereof with reference to the attached drawings, in which.

DETAILED DESCRIPTION

Figure 1:
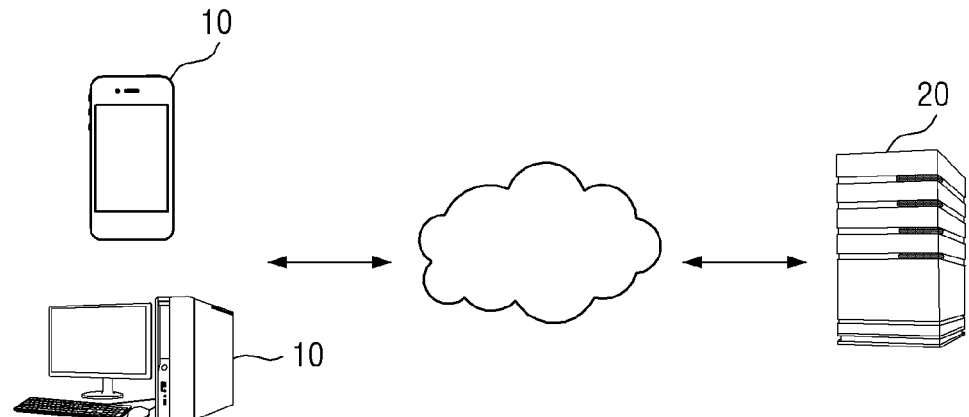
FIG. 1 is a diagram illustrating a configuration of a system for providing suggested items associated with messages according to an example embodiment of the disclosure.

Hereinafter, preferred embodiments of the disclosure will be described with reference to the attached drawings. The advantages and features of the disclosure and methods of accomplishing the same may be understood more readily by reference to the following detailed description of preferred embodiments and the accompanying drawings. The disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the disclosure will only be defined by the appended claims.

In adding reference numerals to the components of each drawing, it should be noted that the same reference numerals are assigned to the same components as much as possible even though they are shown in different drawings. In addition, in describing the disclosure, when it is determined that the detailed description of the related well-known configuration or function may obscure the gist of the disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

The terms "transmit", "receive", and "communicate" as well as the derivatives thereof encompass both direct and indirect communication. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more.

Hereinafter, some embodiments of the disclosure will be described in detail with reference to the accompanying drawings.

FIG. 1 is a diagram illustrating a configuration of a system for providing suggested items associated with messages according to an example embodiment of the disclosure. Referring to FIG. 1, the system according to an example embodiment of the disclosure includes a messenger client terminal 10 and a server 20, and the messenger client terminal 10 is connected to the server 20 through a network.

The messenger client terminal 10 may be an apparatus that performs a function of providing suggested items associated with a specific keyword extracted from a text input to an input window of a chat room of a messenger. Here, the suggested item may include, for example, a conversation group that is a reception target of a message or a content.

The messenger client terminal 10 may receive information on a conversation group or a content associated with the specific keyword based on user information and plural types of content information stored in the server 20 from the server 20 in order to provide the suggested items associated with specific keyword. The messenger client terminal 10 may be, for example, any one of a mobile computing apparatus such as a smartphone, a tablet personal computer (PC), a laptop computer, and a personal digital assistant (PDA), and a fixed computing apparatus such as a desktop PC.

When a preset first keyword (also, "first keyword") is sensed in a message input to the input window of the chat room, the messenger client terminal 10 displays the suggested items including a conversation group or a content associated with the first keyword. In this case, the suggested items may be displayed in an area adjacent to the input window.

As an example embodiment, when the first keyword is a keyword regarding the user information, the messenger client terminal 10 may display the suggested items including a plurality of conversation groups associated with the user information corresponding to the first keyword. In addition, when the first keyword is a keyword regarding the content information, the messenger client terminal 10 may display the suggested items including a plurality of contents associated with the content information corresponding to the first keyword. Here, the user information may include, for example, a user state and a user profile, and the content information may include, for example, e-mail, schedule, contact, and file information.

As an example embodiment, the messenger client terminal 10 may sort and display the suggested items including the conversation group or the content associated with the first keyword based on a similarity to the message.

When one item is selected while displaying the suggested items associated with the first keyword, the messenger client terminal 10 displays a message, including information on a conversation group or a content corresponding to the selected item.

As an example embodiment, the messenger client terminal 10 may display a link item capable of confirming contents of the selected item along with the message of which sending has been completed. In this case, when the selected item of the suggested items is the conversation group, the messenger client terminal 10 may display information on users belonging to the conversation group and confirmation states of the message by the users when the link item is selected. In addition, when the selected item of the suggested items is the content, the messenger client terminal 10 may display details of the content when the link item is selected.

According to the configuration of the system of the disclosure as described above, it is possible to improve user convenience in communication by analyzing a keyword input while writing a message in the chat room of the messenger and suggesting a sending group or an associated content of the message. In addition, it is possible to send a message so that the message is exposed only to a specific member during a conversation in the group chat room, and it is possible to confirm a content related to an input message in the chat room without moving a screen and then send the content along with the message.

Figure 2:
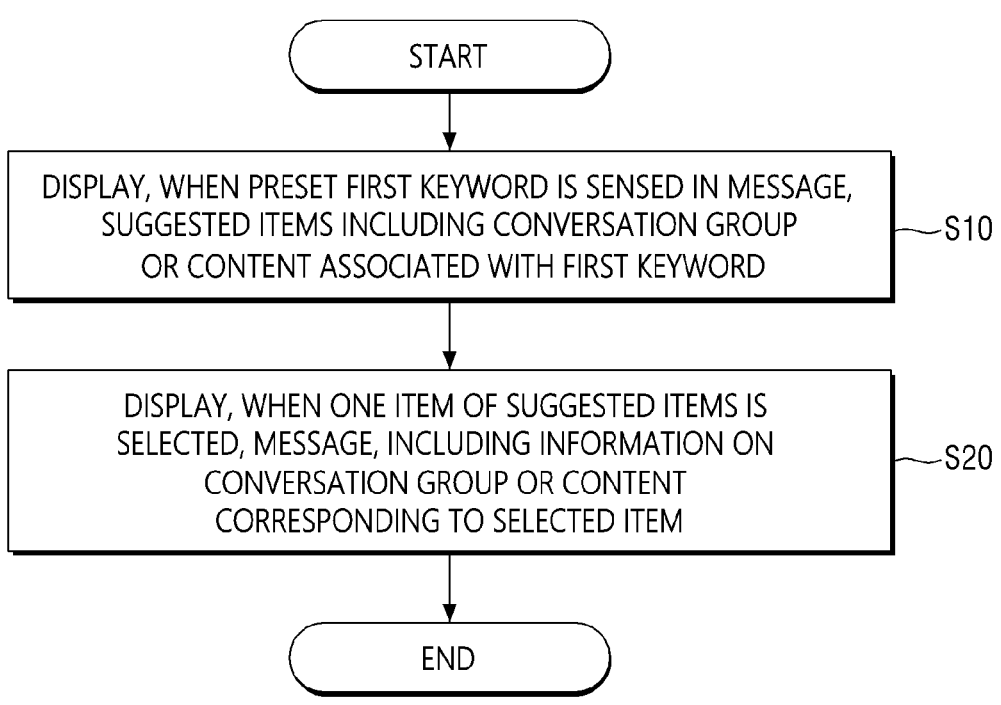
FIG. 2 is a flowchart for describing a method for displaying suggested items associated with messages according to an example embodiment of the disclosure.

FIG. 2 is a flowchart for describing a method for displaying suggested items associated with messages according to an example embodiment of the disclosure.

The method for displaying suggested items associated with messages according to an example embodiment of the disclosure may be executed by the messenger client terminal 10 illustrated in FIG. 1. The messenger client terminal 10 executing the method according to the present example embodiment may be a computing apparatus 100 illustrated in FIG. 13. The messenger client terminal 10 may be, for example, an apparatus capable of performing an arithmetic function, such as a smartphone, a tablet PC, a laptop computer, or a PC.

A description of a subject performing some operations included in the method according to an example embodiment of the disclosure may be omitted, and in such a case, the subject is the messenger client terminal 10.

According to an example embodiment of the disclosure to be described later, it is possible to suggest a conversation group or a content associated with a keyword input while writing a message.

First, in operation S10, when a preset first keyword is sensed in a message input to an input window of a chat room, the messenger client terminal 10 displays suggested items including a conversation group or a content associated with the first keyword.

Figure 3:
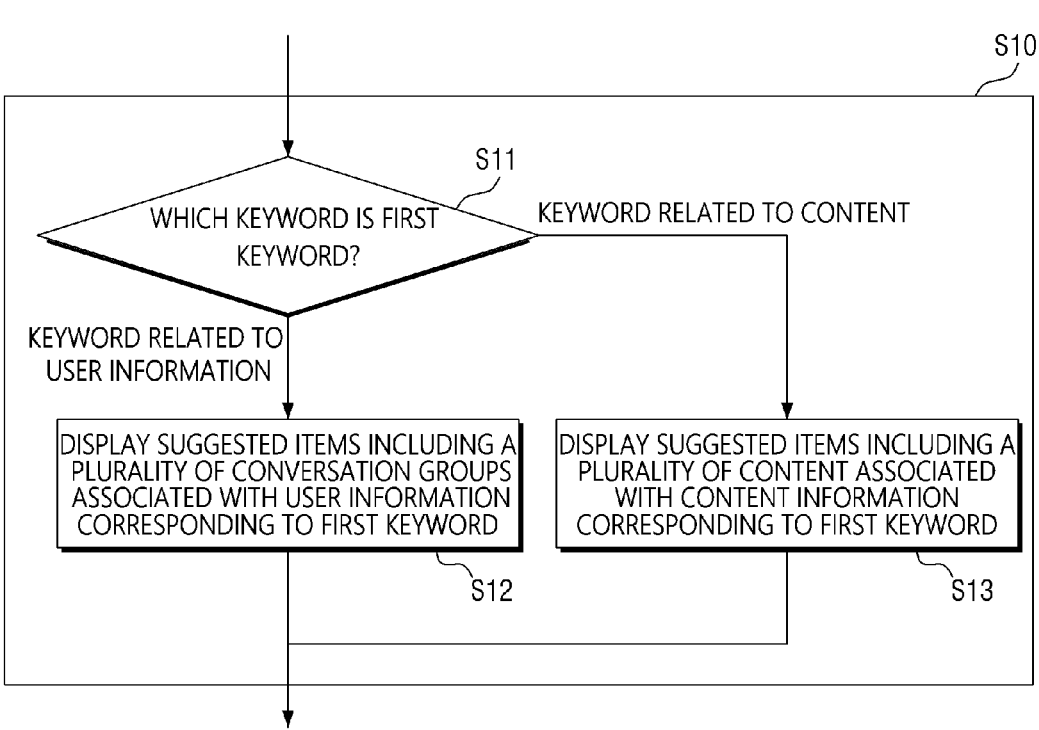
FIGS. 3 to 5 are flowcharts for describing detailed processes of some operations illustrated in FIG. 2.

As an example embodiment, referring to FIG. 3, the operation S10 may include an operation S11 of deciding which keyword the first keyword is, and an operation S12 and an operation S13 that are selectively performed according to the operation S11.

In operation S11, the messenger client terminal 10 decides whether the first keyword is a keyword related to user information or a keyword related to content information. Here, the user information may include, for example, a user state and user profile. For example, the user state may include whether or not the user is absent, such as online, offline, on vacation, in a meeting, or working from home, and the user profile may include personal information in an organization, such as a department, a job, a company, a rank, or a responsibility.

In addition, the content information may include, for example, e-mail, schedule, contact, and file information. For example, the e-mail information may include, for example, a title of a received or sent e-mail or a keyword 'e-mail', and the schedule information may include, for example, a specific date, time, a title of a schedule, a location, or a keyword 'schedule'. In addition, the contact information may include, for example, names, extension numbers, mobile phone numbers, and e-mail addresses, of executives and/or employees registered in user's contact information. In addition, the file information may include, for example, a file title, a storage location, or a keyword 'file'.

As an example embodiment, when it is decided in operation S11 that the first keyword is the keyword related to the user information, the messenger client terminal 10 may display the suggested items including a plurality of conversation groups associated with the user information corresponding to the first keyword in operation S12. In addition, when it is decided in operation Si 1 that the first keyword is the keyword related to the content information, the messenger client terminal 10 may display the suggested items including a plurality of content associated with the content information corresponding to the first keyword in operation S13.

Figure 6:
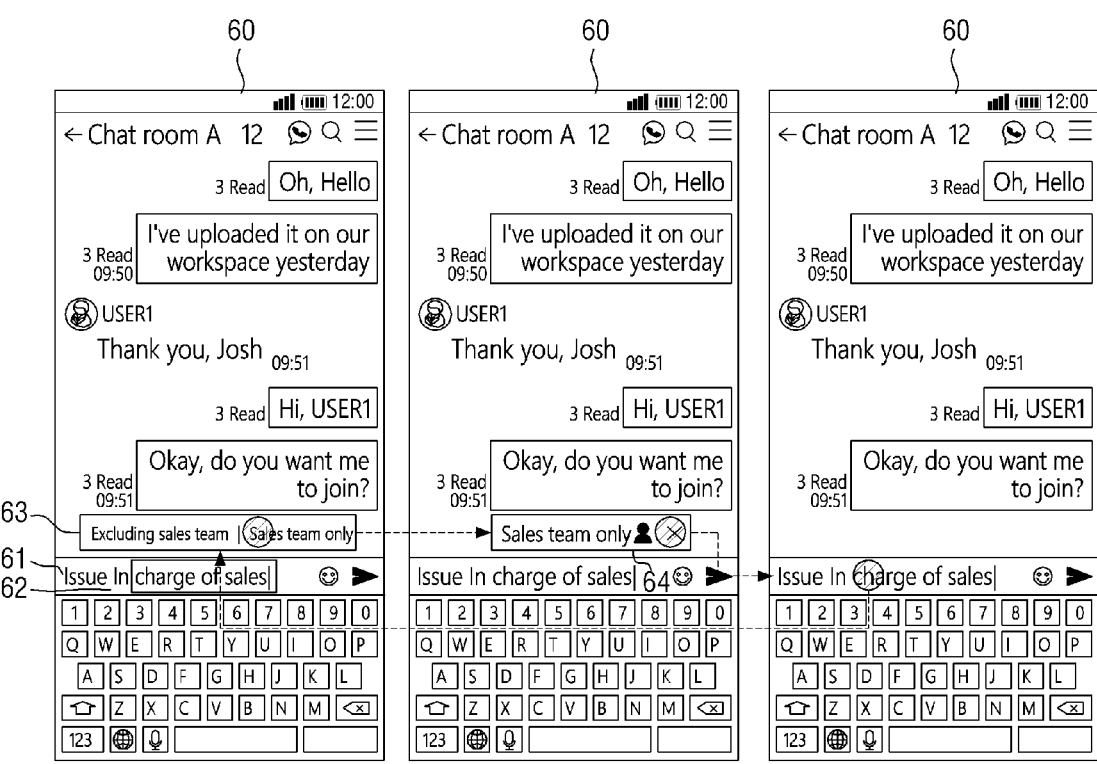
FIG. 6 is an example of a screen suggesting a plurality of conversation groups associated with a keyword input to an input window of a chat room according to some example embodiments of the disclosure.

As an example, referring to FIG. 6, the messenger client terminal 10 may sense a keyword 'in charge of sales' 62 in a text input to an input window 61 of a chat room 60, and display suggested items 63 including 'excluding sales team' and 'sales team only', which are a plurality of conversation groups associated with a 'department', at the top of the input window 61 because the 'in charge of sales' 62 is a keyword related to the user information 'department'. In this case, when an item 'sales team only' of the suggested items 63 is selected, only the selected item 64 may be displayed at the top of the input window 61. In an example illustrated in FIG. 6, the selected item 64 has been displayed in a shape such as a circular chip, but a shape or a color in which the selected item 64 is displayed is not limited. The selected item 64 may be canceled by clicking X displayed on the right.

Figure 4:
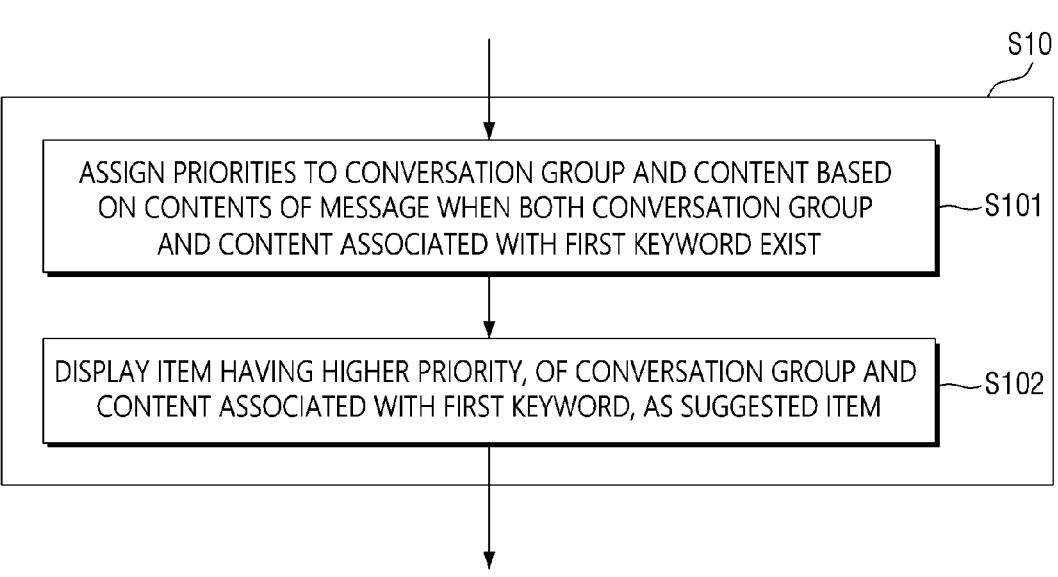

As an example embodiment, referring to FIG. 4, in relation to performing operation S10, in operation S101, the messenger client terminal 10 may assign priorities to the conversation group and the content based on contents of the message when both the conversation group associated with the first keyword and the content associated with the first keyword exist. Accordingly, in operation S102, the messenger client terminal 10 may display an item having a higher priority, of the conversation group and the content associated with the first keyword, as the suggested item.

As another example embodiment, the messenger client terminal 10 may display both a first suggested item including the conversation group and a second suggested item including the content when both the conversation group associated with the first keyword and the content associated with the first keyword exist. In this case, any one of the first suggested item and the second suggested item selected by the user input may be displayed as the suggested item.

Figure 7:
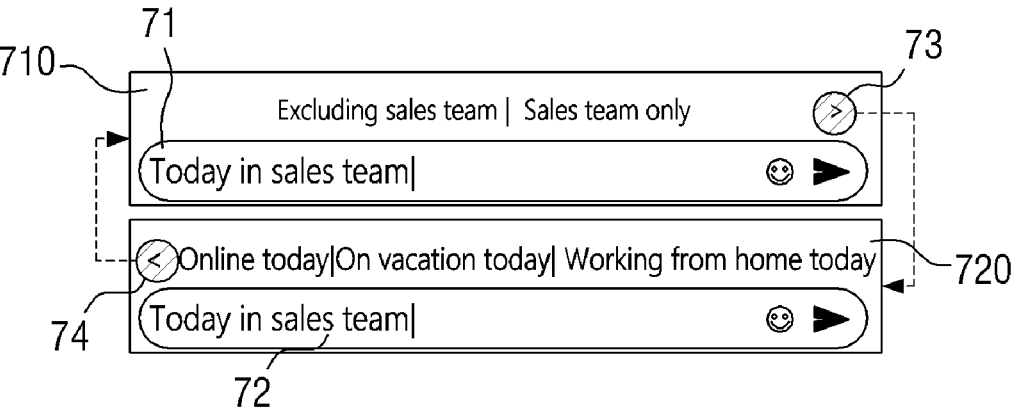
FIG. 7 is an example of an interface displaying suggested items associated with a plurality of keywords according to some example embodiments of the disclosure.

As an example embodiment, as illustrated in FIG. 7, when both a first keyword 'sales team' 71 and a second keyword 'today' 72 are sensed in a message input to the input window of the chat room, the messenger client terminal 10 may simultaneously provide a first suggested item 710, which is a conversation group associated with the 'sales team' 71, and a second suggested item 720, which is a conversation group associated with the 'today' 72. In this case, the messenger client terminal 10 may display the first suggested item 710 including 'excluding sales team' and 'sales team only' and a first search indicator 73 at the top of the input window, and display the second suggested item 720 including 'online today', 'on vacation today', and 'working from home today' at the top of the input window when a user input for the search indicator 73 is received.

Figure 9:
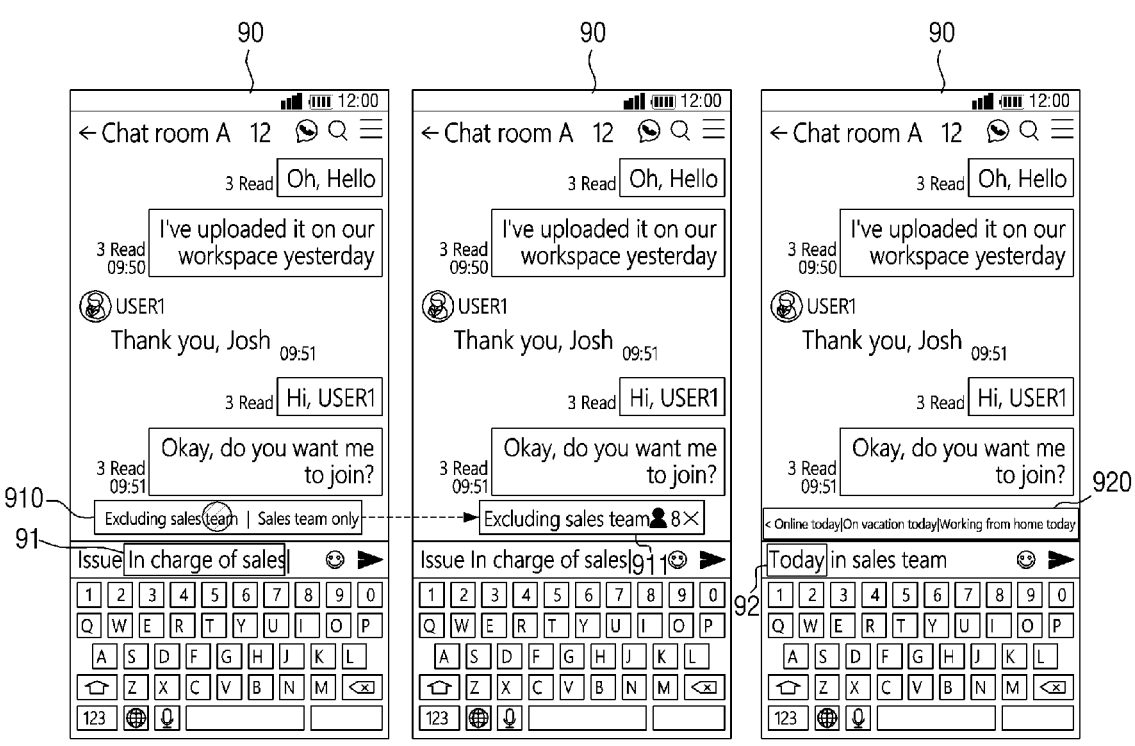
FIGS. 9 and 10 are an example of sending a message to a conversation group selected for each of two keywords according to some example embodiments of the disclosure.
Figure 10:
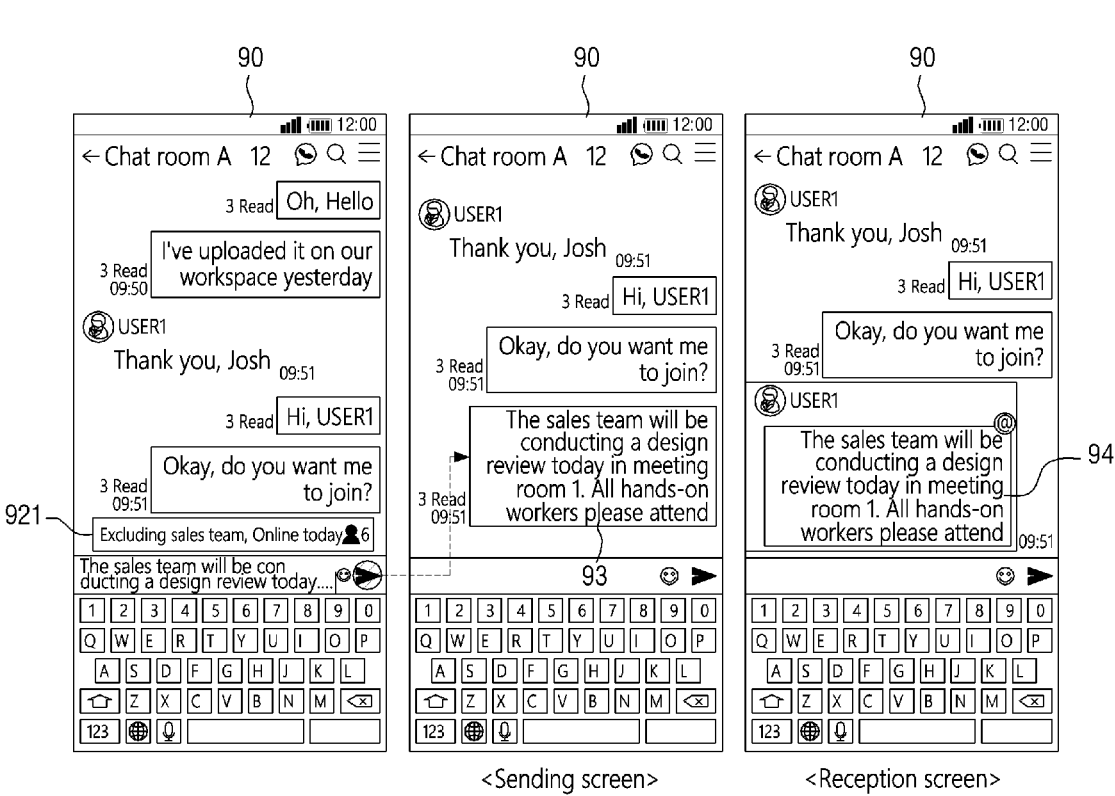

As an example embodiment, as illustrated in FIGS. 9 and 10, when a first keyword 'sales team' 91 is sensed in a message input to an input window of a chat room 90, the messenger client terminal 10 may display first suggested items 910, which are a conversation group associated with the 'sales team' 91, at the top of the input window, and when an item 911 'excluding sales team' of the first suggested items 910 is selected, the messenger client terminal 10 may display the selected item 911 above the input window. In this case, when the second keyword 'today' 92 is sensed in a message additionally input to the input window, the messenger client terminal 10 may display second suggested items 920, which are a conversation group associated with the 'today' 92, at the top of the input window, and when an item 'online today' of the second suggested items 920 is selected, the messenger client terminal 10 may display a selected item 921 including both 'excluding sales team' selected previously and 'online today' at the top of the input window.

Accordingly, the messenger client terminal 10 may expose the message to only six users belonging to a conversation group corresponding to the selected item 921 in chat room A 90 including twelve users. That is, a sent message 93 of which sending has been completed may be displayed as a received message 94 only on a terminal screen of each of the six users.

Figure 11:
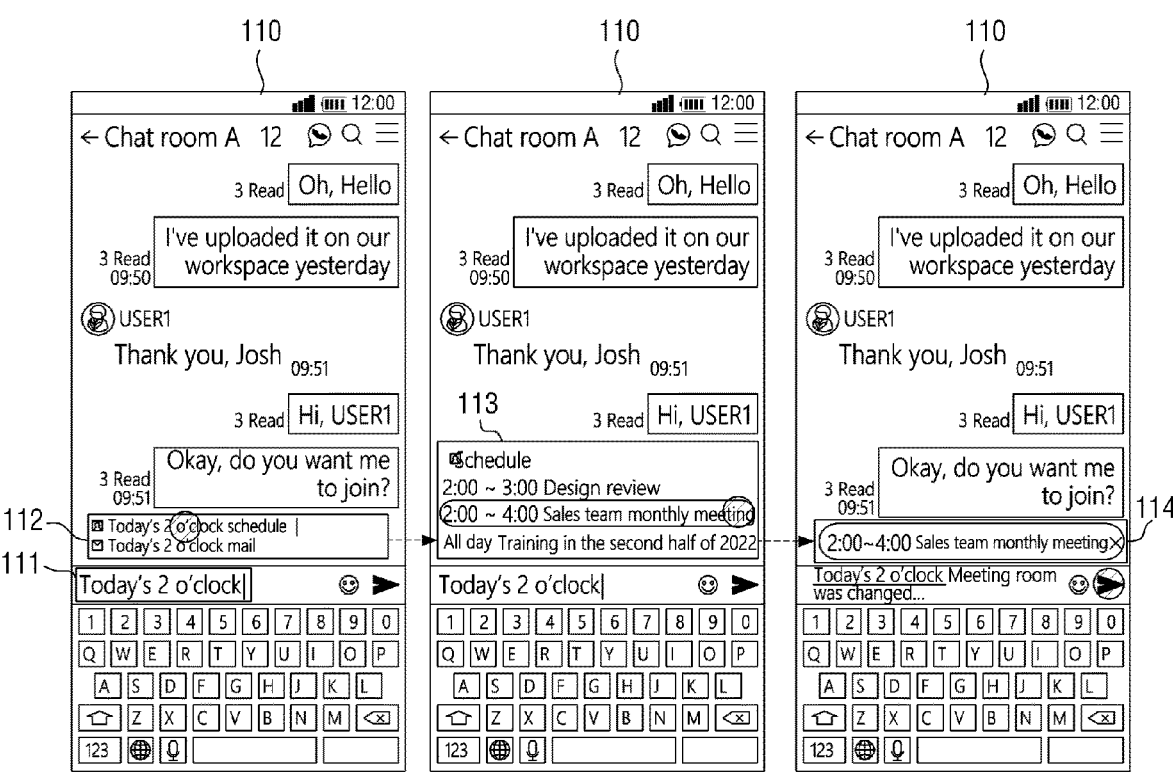
FIG. 11 is an example of a screen suggesting a plurality of contents associated with a keyword input to an input window of a chat room according to some example embodiments of the disclosure.

As another example embodiment, as illustrated in FIG. 11, when a keyword 'today's 2 o'clock' 111 is sensed in a message input to an input window of a chat room 110, the messenger client terminal 10 may display suggested items 112 including a plurality of contents associated with the 'today's 2 o'clock' 111 at the top of the input window. In this case, the suggested items 112 may display contents 'today's 2 o'clock schedule' and 'today's 2 o'clock e-mail', and when an item 'today's 2 o'clock schedule' of such contents is selected, a list 113 of schedule contents related to the selected item may be displayed at the top of the input window. When one schedule is selected from the list 113 of the schedule contents, the messenger client terminal 10 may display the selected schedule 114 at the top of the input window.

Accordingly, the messenger client terminal 10 may share the selected schedule 114 with twelve users belonging to chat room A in chat room A 110 including the twelve users.

Next, in operation S20 of FIG. 2, the messenger client terminal 10 displays, when one item of the suggested items is selected, the message, including information on the conversation group or the content corresponding to the selected item. In this case, a link item capable of confirming contents of the selected item may be displayed along with the message of which sending has been completed.

Figure 5:
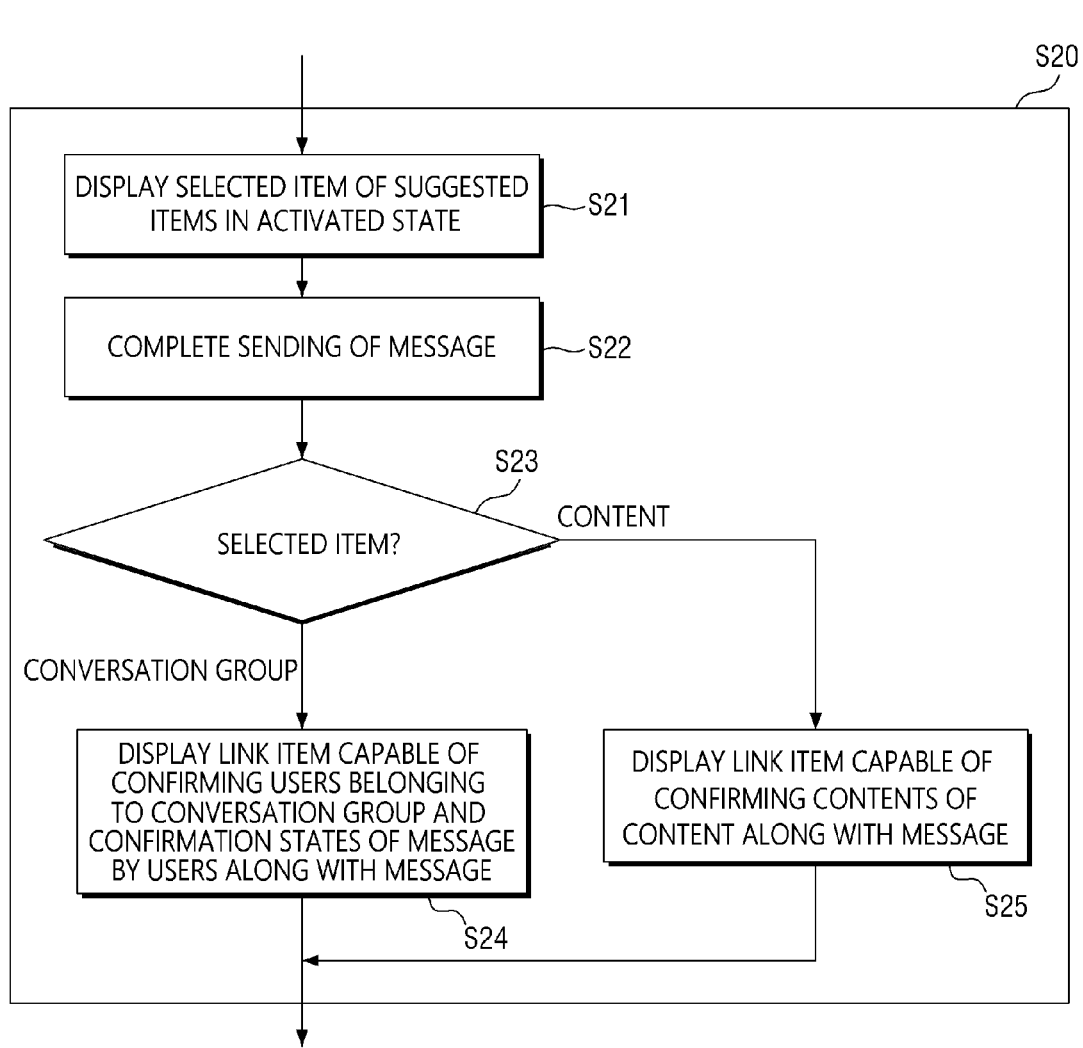

Specifically, referring to FIG. 5, the messenger client terminal 10 may display the selected item of the suggested items in an activated state in operation S21, decide whether the selected item is the conversation group or the content in operation S23 when sending of the message is completed in operation S22, and selectively perform an operation S24 or an operation S25.

As an example embodiment, when it is decided in operation S23 that the selected item is the conversation group, the messenger client terminal 10 may display a link item capable of confirming users belonging to the conversation group and confirmation states of the message by the users along with the message in operation S24. In this case, the message may be displayed only on terminals of the users belonging to the conversation group.

Figure 8:
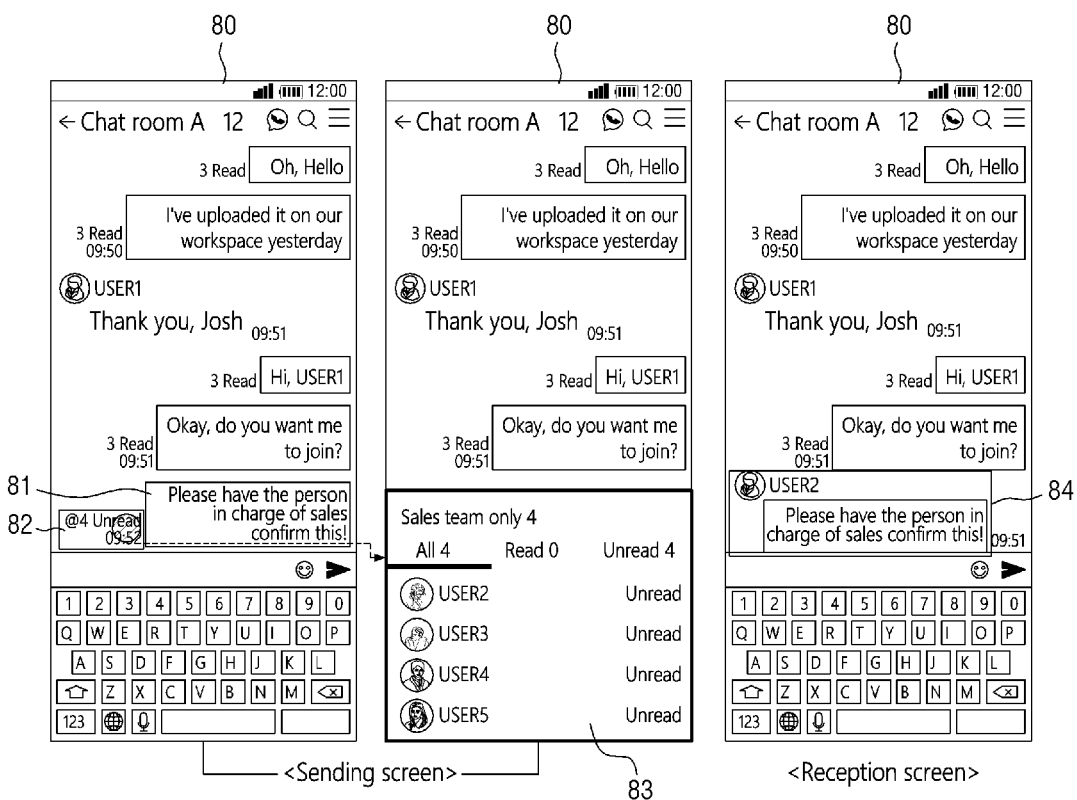
FIG. 8 is an example of an interface capable of confirming contents of a selected item of suggested items according to some example embodiments of the disclosure.

As an example, as illustrated in FIG. 8, the messenger client terminal 10 may display a link item 82 capable of confirming information on the selected item 64 along with a sent message 81 of which sending has been completed because the selected item 64 of the suggested items 63 in FIG. 6 corresponds to a conversation group 'sales team only'. As an example, the link item 82 may display information on the number of users who have not read the message among users belonging to the conversation group.

In this case, when the link item 82 is selected, users included in the conversation group 'sales team only' and confirmation states of the message by the respective users may be displayed on a separate pop-up window 83. Meanwhile, the message of which the sending has been completed may be displayed as a received message 84 only on terminal screens of the users belonging to the conversation group 'sales team only'.

As another example embodiment, when it is decided in operation S23 that the selected item is the content, the messenger client terminal 10 may display a link item capable of confirming contents of the content along with the message in operation S25.

Figure 12:
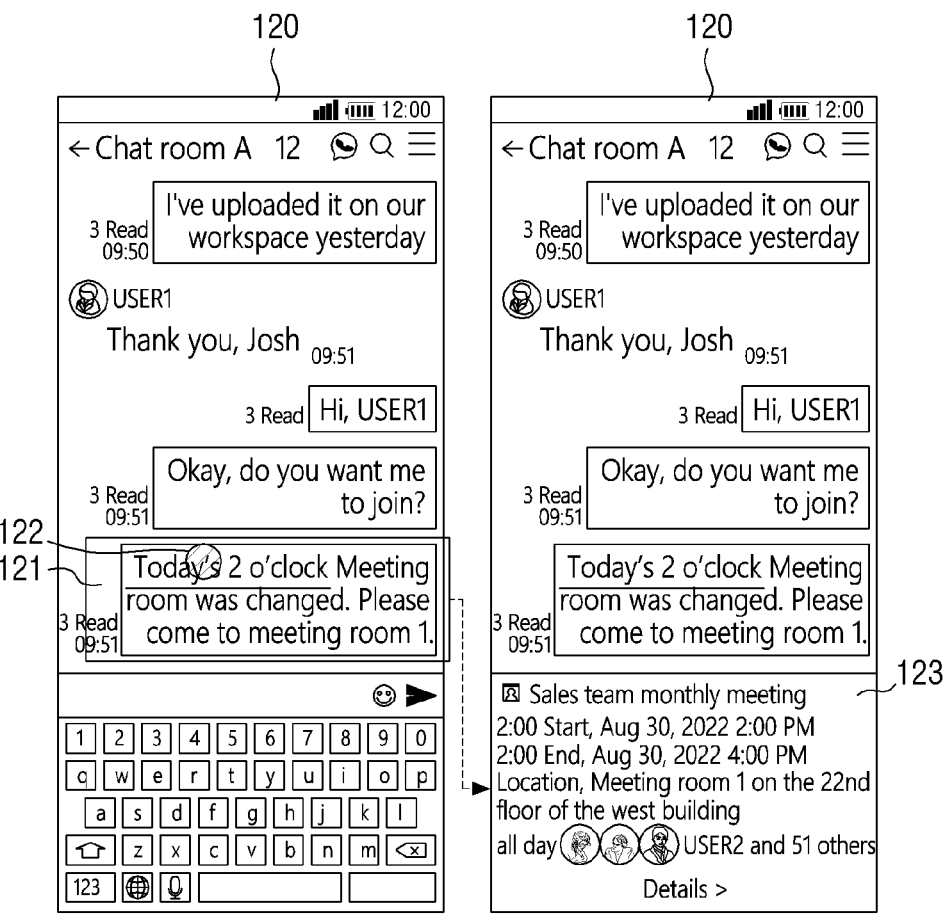
FIG. 12 is an example of sending a message to which a selected content of a plurality of suggested contents is linked according to some example embodiments of the disclosure.

As an example, as illustrated in FIG. 12, the messenger client terminal 10 may display a link item 122 capable of confirming information on the selected schedule 114 for the keyword 'today's 2 o'clock' in a sent message 121 of which sending has been completed because the selected schedule 114 of the suggested items 112 in FIG. 11 corresponds to a schedule content '2:00-4:00 sales team monthly meeting'. As an example, the link item 122 may link a uniform resource locator (URL) capable of confirming the selected schedule 114.

In this case, when the link item 122 is selected, start time, end time, location, and attendee information, and the like, which are detail contents of the schedule content '2:00-4:00 sales team monthly meeting', may be displayed on a separate pop-up window 123.

As described above, according to the method according to an example embodiment of the disclosure, it is possible to suggest a sending group or an associated content of a message by analyzing the keyword input while writing the message in the chat room of the messenger. In addition, it is possible to provide an effect of sending a message so that the message is exposed only to a specific member during a conversation in the group chat room, and it is possible to confirm a content related to the message in the chat room without moving a screen and then send the content along with the message.

Figure 13:
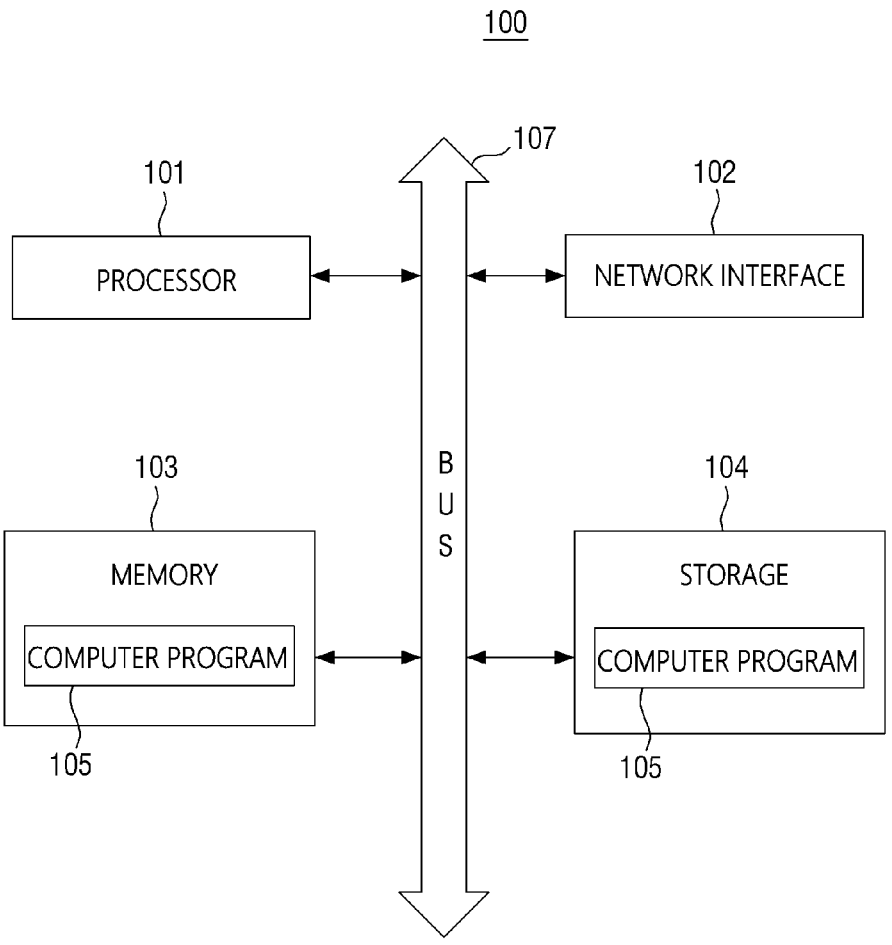
FIG. 13 is a hardware configuration diagram of an illustrative computing apparatus capable of implementing methods according to an example embodiment of the disclosure.

FIG. 13 is a hardware configuration diagram of an example computing device 100.

Referring to FIG. 13, the computing device 100 may include one or more processors 101, a bus 107, a network interface 102, a memory 103, which loads a computer program 105 executed by the processors 101, and a storage 104 for storing the computer program 105.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the disclosure. The computing device 100 may have one or more processors.

The memory 103 stores various data, instructions and/or information. The memory 103 may load one or more programs 105 from the storage 104 to execute methods/operations according to various embodiments of the disclosure. An example of the memory 103 may be a RAM, but is not limited thereto.

The bus 107 provides communication between components of computing device 100. The bus 107 may be implemented as various types of bus such as an address bus, a data bus and a control bus.

The network interface 102 supports wired and wireless internet communication of the computing device 100. The network interface 102 may support various communication methods other than internet communication. To this end, the network interface 102 may be configured to comprise a communication module well known in the art of the disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the disclosure are implemented. When the computer program 105 is loaded on the memory 103, the processor 101 may perform the methods/operations in accordance with various embodiments of the disclosure by executing the one or more instructions.

As an example embodiment, the computer program 105 may include instructions for performing an operation of displaying, when a preset first keyword is sensed in a message input to an input window of a chat room, suggested items including a conversation group or a content associated with the first keyword, the conversation group being a reception target of the message; and an operation of displaying, when one item of the suggested items is selected, the message, including information on the conversation group or the content corresponding to the selected item.

The technical features of the disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the disclosure. Therefore, the disclosed preferred embodiments of the disclosure are used in a generic and descriptive sense only and not for purposes of limitation.

What is claimed is:

1. A method for displaying suggested items associated with a message, the method being performed by at least one processor and comprising:

based on a preset first keyword that is detected in a message that is input to an input window of a chat room, displaying suggested items comprising a conversation group or a content associated with the preset first keyword, wherein the conversation group corresponds to a reception target of the message; and based on an item selected from the suggested items, displaying the message comprising information on the conversation group or the content corresponding to the selected item, wherein the displaying of the suggested items comprises:

based on a determination that both the conversation group associated with the preset first keyword and the content associated with the preset first keyword exist, displaying a first suggested item comprising the conversation group and a second suggested item comprising the content; and displaying, as a suggested item, any one of the first suggested item and the second suggested item selected by a user input.

2. The method of claim 1, wherein the displaying of the suggested items comprises, based on the preset first keyword being a keyword regarding user information, displaying the suggested items comprising a plurality of conversation groups associated with the user information corresponding to the preset first keyword.

3. The method of claim 2, wherein the user information comprises a user state and a user profile.

4. The method of claim 1, wherein the displaying of the suggested items comprises, based on the preset first keyword being a keyword regarding content information, displaying the suggested items comprising a plurality of contents associated with the content information corresponding to the preset first keyword.

5. The method of claim 4, wherein the content information comprises at least one of e-mail, schedule, contact, or file information.

6. The method of claim 1, wherein the displaying of the suggested items comprises:

based on a determination that both the conversation group associated with the preset first keyword and the content associated with the preset first keyword exist, assigning priorities to the conversation group and the content based on contents of the message; and displaying, as a suggested item, an item having a higher priority, of the conversation group and the content associated with the preset first keyword.

7. The method of claim 1, wherein the displaying of the suggested items comprises displaying the suggested items in an area adjacent to the input window.

8. The method of claim 1, wherein the displaying of the message comprising the information on the conversation group or the content c:

based on the item selected from the suggested items, displaying the selected item in an activated state; and based on a completion of sending of the message, displaying a link item capable of confirming contents of the selected item of the suggested items along with the message of which the sending has been completed.

9. The method of claim 8, wherein the displaying of the link item comprises, based on the selected item of the suggested items, the selected item being a first conversation group, displaying users belonging to the first conversation group and confirmation states of the message by the users based on the link item being selected, and wherein the message is displayed only on terminals of the users belonging to the first conversation group.

10. The method of claim 8, wherein the displaying of the link item comprises:

based on the selected item of the suggested items being a content, and the link item being selected, displaying the content of the selected item.

11. The method of claim 1, further comprising:

based on both the preset first keyword and a preset second keyword that are detected in the message that is input to the input window of the chat room, simultaneously providing a first suggested item associated with the preset first keyword and a second suggested item associated with the preset second keyword.

12. The method of claim 11, wherein the simultaneous providing of the first suggested item and the second suggested item comprises:

displaying the first suggested item and a search indicator; and based on a user input for the search indicator being received, displaying the second suggested item.

13. The method of claim 1, wherein the displaying of the suggested items comprises:

transmitting a request for information on the conversation group or the content associated with the preset first keyword to a server;

receiving, from the server, the information on the conversation group or the content associated with the preset first keyword extracted based on user information and plural types of content information stored in the server; and displaying the suggested items based on the information received from the server.

14. A non-transitory computer-readable recording medium storing computer program, which, when executed by at least one processor, causes the at least one processor to execute:

based on a preset first keyword that is detected in a message that is input to an input window of a chat room, displaying suggested items comprising a conversation group or a content associated with the preset first keyword, wherein the conversation group corresponds to a reception target of the message; and based on an item selected from the suggested items, displaying the message comprising information on the conversation group or the content corresponding to the selected item, wherein the displaying of the suggested items comprises:

based on a determination that both the conversation group associated with the preset first keyword and the content associated with the preset first keyword exist, displaying a first suggested item comprising the conversation group and a second suggested item comprising the content; and displaying, as a suggested item, any one of the first suggested item and the second suggested item selected by a user input.

15. A messenger client terminal comprising:

one or more processors;

a memory configured to load a computer program executable by the one or more processors; and wherein the computer program comprises instructions, which, when executed by the one or more processors, cause the one or more processors to execute:

based on a preset first keyword being detected in a message that is input to an input window of a chat room, displaying suggested items comprising a conversation group or a content associated with the preset first keyword, the conversation group being a reception target of the message; and based on the item selected from the suggested items, displaying the message comprising information on the conversation group or the content corresponding to the selected item, wherein the displaying of the suggested items comprises:

based on a determination that both the conversation group associated with the preset first keyword and the content associated with the preset first keyword exist, displaying a first suggested item comprising the conversation group and a second suggested item comprising the content; and displaying, as a suggested item, any one of the first suggested item and the second suggested item selected by a user input.

16. The messenger client terminal of claim 15, wherein the preset first keyword comprises at least one of a tense, a department, a rank, a business, an employment state, a user profile, an e-mail title, a file name, a meeting title, meeting room information, or contact information.

17. The messenger client terminal of claim 15, wherein the displaying of the suggested items comprises: an operation of sorting and displaying the suggested items comprising the conversation group or the content associated with the preset first keyword based on a similarity to the message.

\* \* \* \* \*